(12) United States Patent
Kitamura et al.

(10) Patent No.: US 10,832,879 B1
(45) Date of Patent: Nov. 10, 2020

(54) INPUT DEVICE AND ELECTRONIC APPARATUS

(71) Applicant: LENOVO (SINGAPORE) PTE. LTD., Singapore (SG)

(72) Inventors: Masahiro Kitamura, Yokohama (JP); Satoshi Douzono, Yokohama (JP); Takanori Koike, Yokohama (JP); Kazumi Nakaju, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/558,313

(22) Filed: Sep. 3, 2019

(30) Foreign Application Priority Data

Jun. 13, 2019 (JP) .................. 2019-110640

(51) Int. Cl.
*G06F 1/16* (2006.01)
*H01H 21/22* (2006.01)
*H01H 21/12* (2006.01)
*H01H 13/705* (2006.01)

(52) U.S. Cl.
CPC .......... *H01H 21/22* (2013.01); *G06F 1/1616* (2013.01); *G06F 1/1671* (2013.01); *H01H 21/12* (2013.01); *H01H 13/705* (2013.01)

(58) Field of Classification Search
CPC ..................................................... G06F 1/169
USPC ... 361/679.08, 679.09, 679.1, 679.18, 679.4; 345/156, 157, 160, 168
See application file for complete search history.

(56) References Cited

U.S. PATENT DOCUMENTS

| | | | | |
|---|---|---|---|---|
| 5,694,123 | A * | 12/1997 | Selker | G06F 1/1616 341/22 |
| 5,764,474 | A * | 6/1998 | Youens | G06F 1/1616 345/169 |
| 10,379,634 | B2 * | 8/2019 | Komatsu | G06F 3/038 |
| 10,593,490 | B2 * | 3/2020 | Kitamura | H01H 13/705 |
| 2009/0174678 | A1 * | 7/2009 | Mathew | G06F 1/1662 345/173 |
| 2011/0080354 | A1 * | 4/2011 | Chiang | G06F 3/03547 345/173 |
| 2012/0250251 | A1 * | 10/2012 | Liang | H01H 13/705 361/679.55 |
| 2014/0015754 | A1 * | 1/2014 | Chang | G06F 3/03547 345/168 |
| 2014/0293157 | A1 * | 10/2014 | Hoshi | G06F 1/169 349/12 |
| 2015/0160750 | A1 * | 6/2015 | Wu | G06F 1/169 345/173 |

(Continued)

FOREIGN PATENT DOCUMENTS

JP 2018060664 A 4/2018

*Primary Examiner* — Anthony Q Edwards
(74) *Attorney, Agent, or Firm* — Shimokaji IP (57) ABSTRACT

An input device includes a base plate and a push button rotatably provided on a top surface of the base plate. The base plate has a bearing part protruding from the top surface. The push button has an operation surface part receiving a push down operation and a positioning part rotatably supported by the bearing part. The positioning part positions the push button in the plate thickness direction of the bearing part by an abutting part abutting on a first face of the bearing part and a pushing part resiliently biased toward and pushing a second face of the bearing part.

8 Claims, 7 Drawing Sheets

(56) References Cited

U.S. PATENT DOCUMENTS

2016/0147328 A1* 5/2016 Doi ................... G06F 3/0202
                                                    345/157
2017/0255230 A1* 9/2017 Regimbal ............ G06F 1/1658
2019/0278326 A1* 9/2019 Chu ................... G06F 1/1654

* cited by examiner

INPUT DEVICE AND ELECTRONIC APPARATUS

FIELD OF THE INVENTION

The present invention relates to an input device with a push button and to an electronic apparatus including the input device.

BACKGROUND OF THE INVENTION

An electronic apparatus such as a Laptop PC may be provided with a push button located close to, e.g., a keyboard device. In Japanese Patent No. 6291006, the applicant has disclosed a Laptop PC having a touch pad and a pointing stick operated instead of a mouse. On a near side of its keyboard device, the Laptop PC has a push button which corresponds to a left or right button of a mouse and is used along with the touch pad and the pointing stick.

SUMMARY OF THE INVENTION

In an input device of the above Japanese Patent No. 6291006, a housing plate is laminated on a base plate which serves as a support plate for a keyboard device, and the housing plate is provided with a hole. By inserting a hinge of the push button into this hole, the input device allows the push button to be positioned in a left-right direction. For an accurate positioning of the push button in the left-right direction, it is necessary to make a gap between the hinge and an inner wall surface of the hole as small as possible. However, this leads to a concern that the hinge may interfere with the inner wall surface of the hole due to a manufacturing tolerance or an assembling tolerance of the push button, base plate or others, which results in preventing the push button from operating smoothly. In order to surely avoid the interference, the gap between the hinge and the inner wall surface of the hole needs to be widened. But this in turn leads to another concern that the push button may come loose or interfere with a surrounding frame.

The present invention has been made in view of the above-described problems with the prior art, and an object thereof is to provide an input device which allows both an accurate positioning and smooth operation of the push button and to provide an electronic apparatus including the input device.

An input device according to the first aspect of the present invention includes: a base plate; and a push button rotatably provided on a top surface of the base plate, wherein the base plate has a bearing part protruding from the top surface, the push button has an operation surface part receiving a push down operation and a positioning part rotatably supported by the bearing part, and the positioning part has an abutting part abutting a first face of the bearing part and a pushing part resiliently biased toward and pushing a second face opposite to the first face, the abutting part and the pushing part positioning the push button in a plate thickness direction of the bearing part.

A position where the abutting part abuts on the first face and a position where the pushing part pushes the second face may be deviated from each other in a direction along the first face of the bearing part.

The abutting part and the pushing part may be provided in positions deviated from the operation surface part in a plan view, and a rotating shaft between the positioning part and the bearing part may be located outside the operation surface part in a plan view.

The positioning part may further have: a first arm extending from an edge of the operation surface part, the first arm being provided with the abutting part on a tip thereof; and a second arm extending from an edge of the operation surface part, the second arm being aligned with the first arm and being provided with the pushing part on a tip thereof.

The bearing part may have a hook shape erected from the top surface of the base plate and bent, and the positioning part may further have a support part on which a bottom end face of the bearing part abuts so as to be relatively movable in the plate thickness direction.

The base plate may further have a second bearing part protruding from the top surface and being parallel to the bearing part, and the push button may further have a rotation support part provided to be aligned with the positioning part in a width direction of the operation surface part and rotatably supported by the second bearing part, and the rotation support part may be supported by the second bearing part in such a manner that the rotation support part is movable along a plate thickness direction of the second bearing part.

The base plate may further have a projection piece erected from the top surface, and the push button may further have a positioning hole formed on a bottom surface thereof, the projection piece being slidably inserted into the positioning hole, and the projection piece may be inserted into the positioning hole so as not to be relatively movable in a direction that is perpendicular to at least the plate thickness direction as well as in a direction that is parallel to the top surface.

An electronic apparatus according to the second aspect of the present invention includes: a keyboard device having an input device as described above and a plurality of key tops supported on a top surface of the base plate so as to be movable in a top-bottom direction; a main body chassis provided with the keyboard device; and a display chassis pivotably connected to the main body chassis and having a display.

The above aspects of the present invention allow both an accurate positioning and smooth operation of the push button.

DETAILED DESCRIPTION OF THE INVENTION

In the following, a preferred embodiment of an input device and an electronic apparatus according to the present invention will be described with reference to accompanying drawings.

Figure 1:
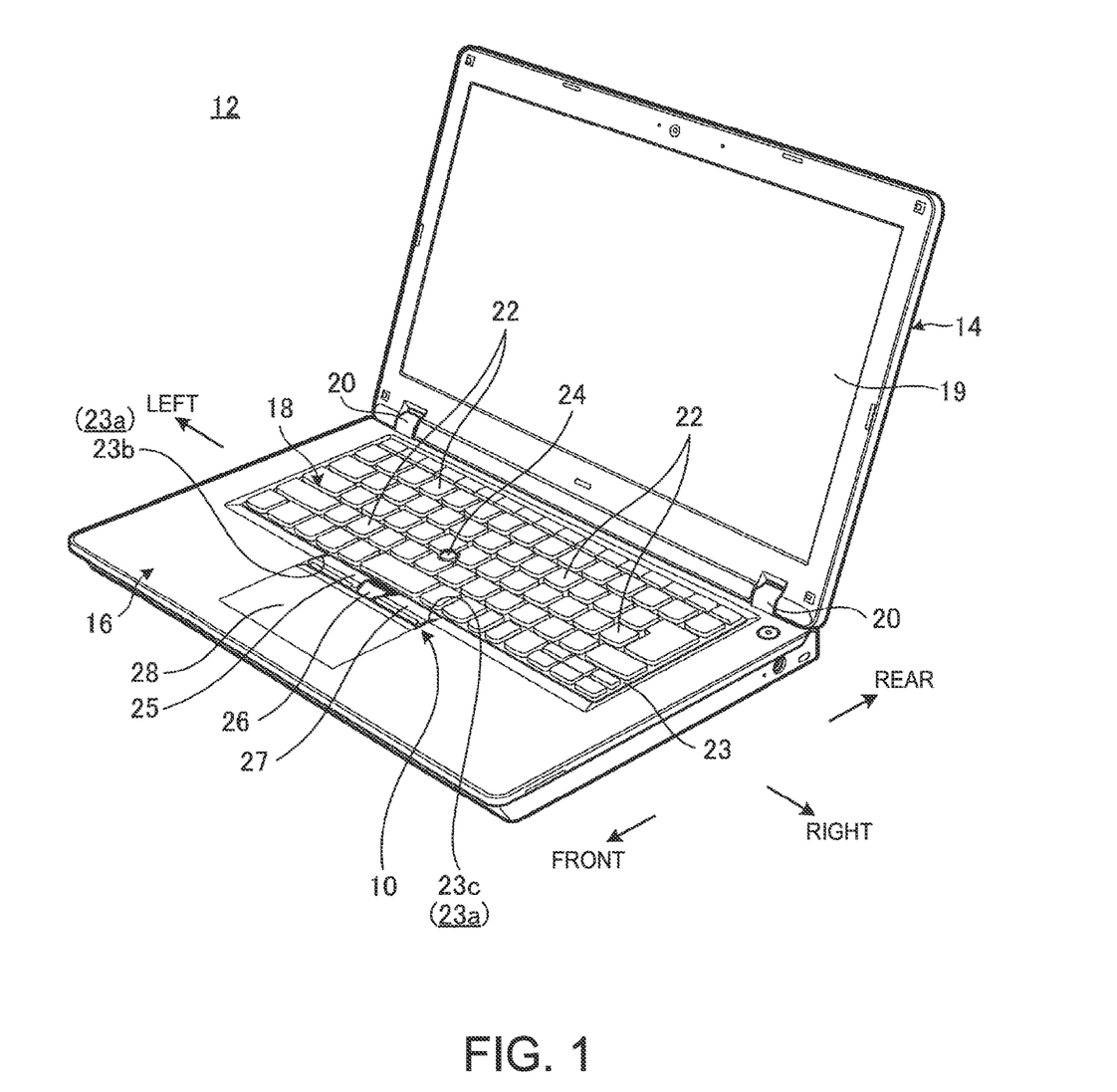
FIG. 1 is a perspective view of an electronic apparatus including an input device according to an embodiment.

FIG. 1 is a perspective view of an electronic apparatus 12 including an input device 10 according to an embodiment. As illustrated in FIG. 1, the electronic apparatus 12 is a Laptop PC in which a display chassis 14 is pivotably connected to a main body chassis 16. The input device 10 of the present embodiment is integrally formed with a keyboard device 18 of the electronic apparatus 12. The input device 10 may also be provided separately from the keyboard device 18. The input device 10 may be mounted to an electronic apparatus other than a Laptop PC. For example, the input device 10 may be mounted to an external keyboard device connected to a desktop PC or the like.

In the following, the input device 10 is described based on a direction in which a user sees and uses the electronic apparatus 12 as illustrated in FIG. 1. A near side is referred to as "front", a far side as "rear", a thickness direction of the main body chassis 16 as "top-bottom", and a width direction as "left-right".

The display chassis 14 is a chassis in a form of a thin box. It has a display 19. The display 19 is, for example, a liquid crystal display. The display chassis 14 is pivotably connected to the main body chassis 16 through a chassis hinge 20.

The main body chassis 16 is a chassis in a form of a thin box. The main body chassis 16 houses various electronic components such as an electronic circuit board, an operation processing unit and a memory implemented on the electronic circuit board, and a battery device.

A keyboard device 18 is provided on a top surface of the main body chassis 16. The keyboard device 18 includes a plurality of key tops 22 arranged in front-rear direction as well as left-right direction. The neighboring key tops 22, 22 are partitioned by a frame 23. Around a center of the keyboard device 18, a pointing stick 24 is provided. The pointing stick 24 is an input device for operating a cursor (mouse pointer) displayed on a display 19 and can be operated instead of a mouse.

The input device 10 is provided around the center of a front edge of the input device 18. In the present embodiment, the input device 10 is configured by three push buttons 25, 26 and 27. The push buttons 25 to 27 function in conjunction with a cursor operation with the pointing stick 24 or a touch pad 28. The touch pad 28 is provided in front of the push buttons 25 to 27 and can be operated instead of a mouse, just like the pointing stick 24.

Figure 2:
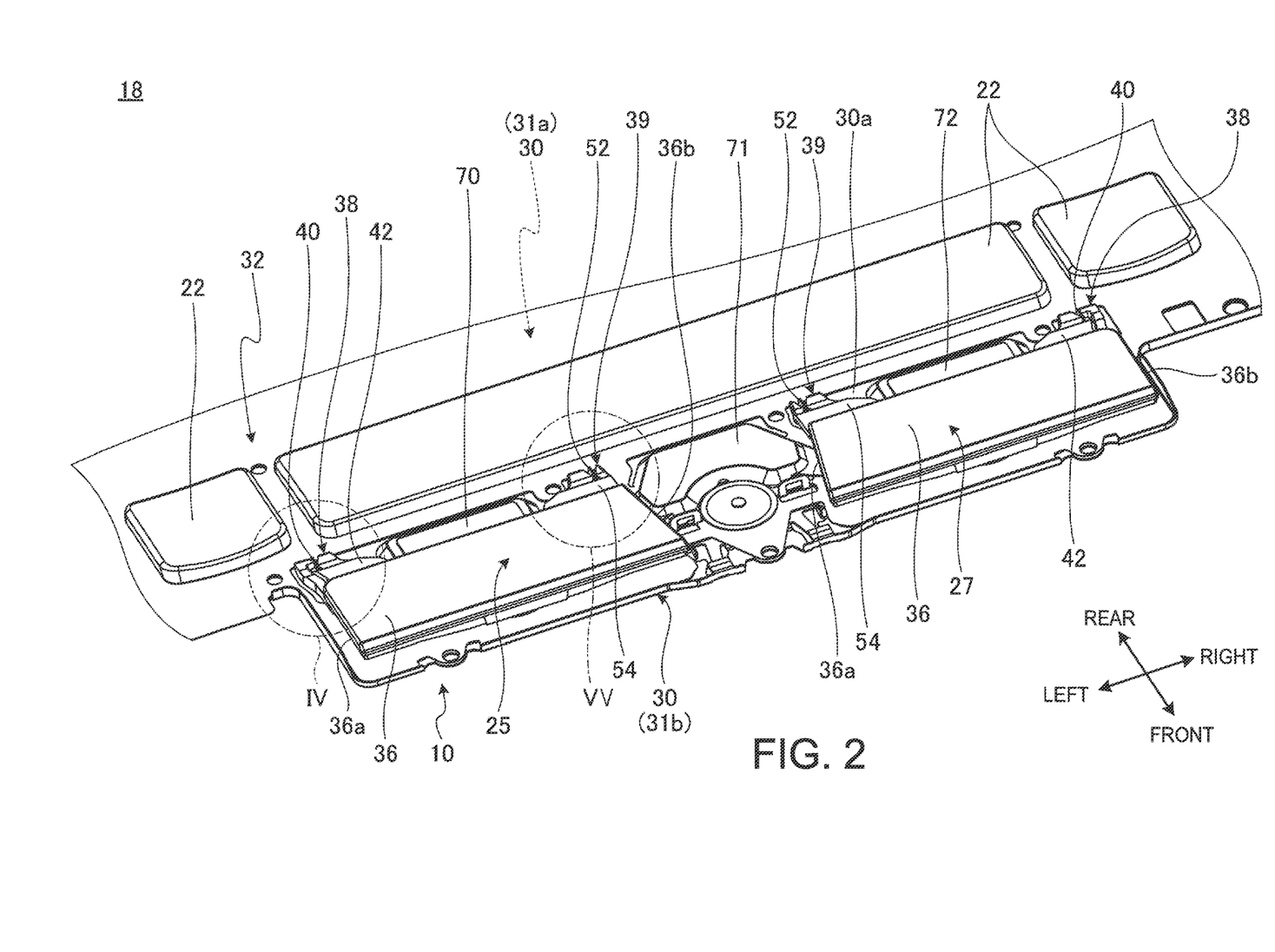
FIG. 2 is an enlarged perspective view of the input device shown in FIG. 1 and a periphery thereof in which a frame is omitted.

FIG. 2 is an enlarged perspective view of the input device 10 shown in FIG. 1 and the periphery thereof in which the frame 23 is omitted. Note that the push button 26 in the middle is not shown in FIG. 2.

As shown in FIG. 2, the keyboard device 18 includes a base plate 30 on which the key tops 22 and the input device 10 are mounted. The base plate 30 is a thin metal plate formed of aluminum, stainless or the like provided with some cut-and-raised portions and punched portions. The base plate 30 includes a first plate member 31a and a second plate member 31b. The first plate member 31a is a substantially rectangular larger plate which collectively supports all the key tops 22. The second plate member 31b is a substantially rectangular smaller plate which supports the push buttons 25 to 27. The second plate member 31b extends toward the front from almost the center of a front edge of the first plate member 31a.

Figure 8:
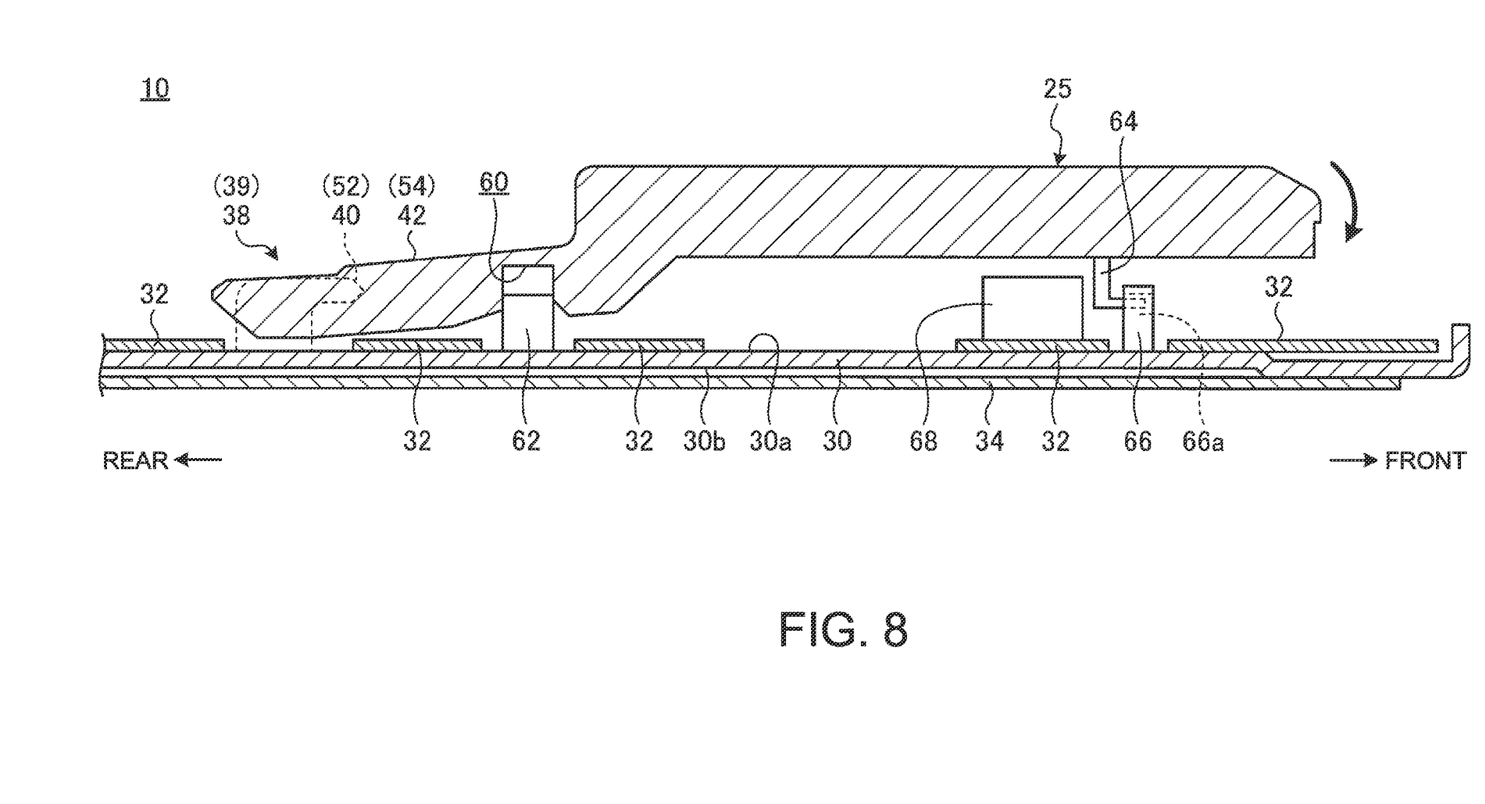
FIG. 8 is a sectional side view schematically showing the push button and a periphery thereof.

On the base plate 30, a membrane sheet 32 is laminated on a top surface 30a and a light guide plate 34 is laminated on a bottom surface 30b (see also FIG. 8). The membrane sheet 32 is, e.g., a switch sheet having a three-layer structure in which, when pressed at a position where a fixed contact overlaps with a movable contact, the fixed and movable contacts come into contact and are closed. The membrane sheet 32 may have a structure other than the three-layer structure. For example, it may use a contact switch in which a circuit is short-circuited by a conductive member made of rubber. The membrane sheet 32 is provided with through-holes, and through some of these through-holes, elevation guides of the key tops 22 are mounted on the top surface 30a of the base plate 30. The key tops 22 move up and down in accordance with a guidance by the elevation guides. When they move down, the key tops turn on the switch of the membrane sheet 32 via rubber domes (not shown). The membrane sheet 32 may be laminated on the bottom surface 30b of the base plate 30. The light guide plate 34 guides and reflect the light emitted from the light source such as an LED element, thereby illuminating the key tops 22 from the bottom surface side. The light guide plate 34 may be omitted. Instead, a waterproof sheet may be provided.

Figure 3:
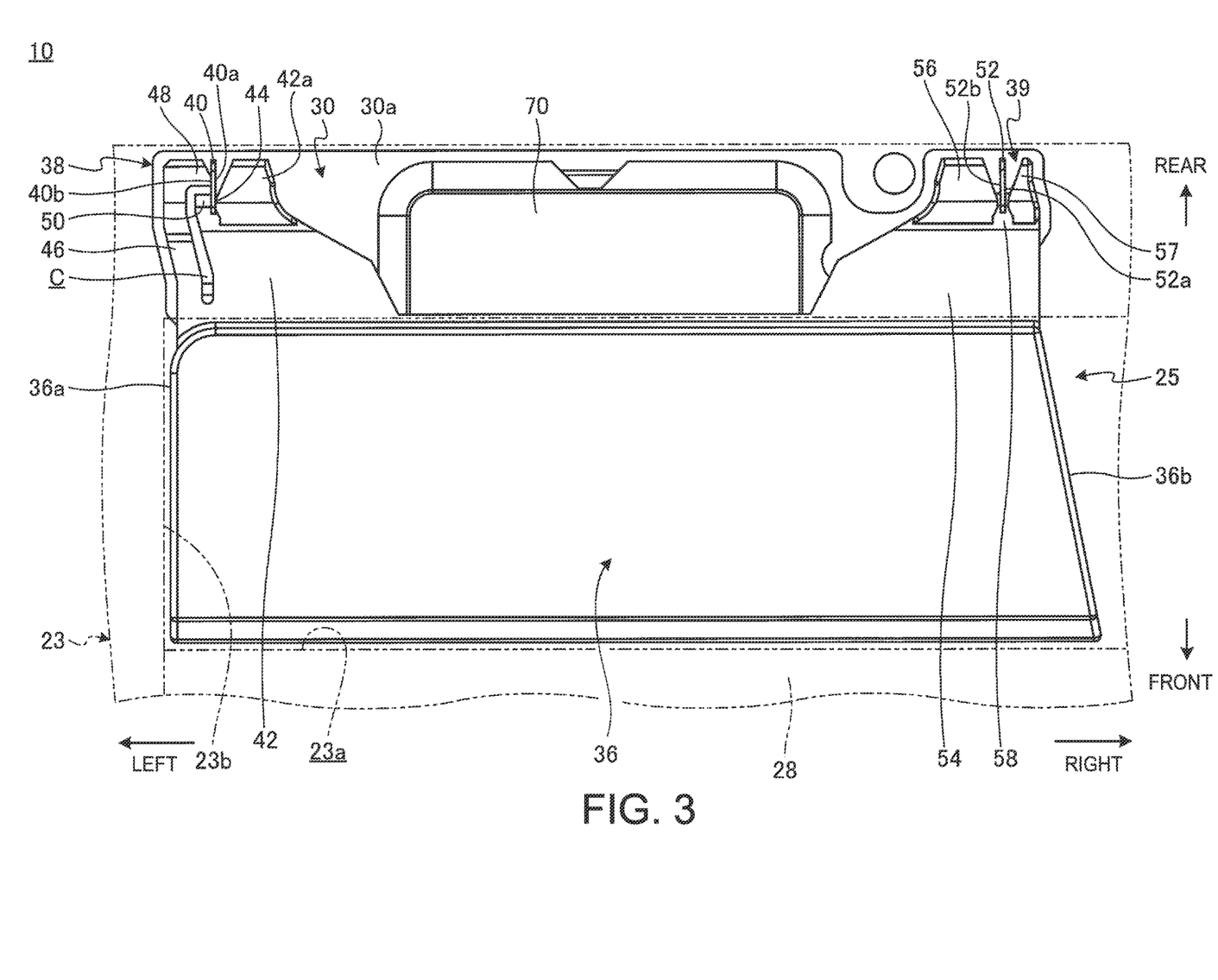
FIG. 3 is an enlarged plan view of a push button shown in FIG. 2 and a periphery thereof.
Figure 4:
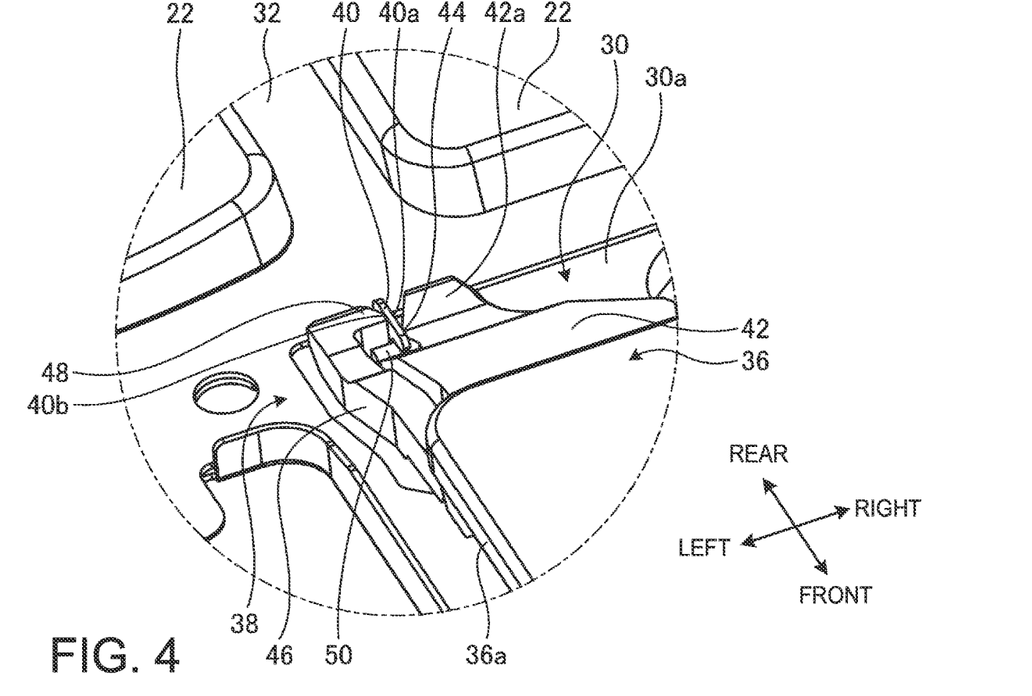
FIG. 4 is an enlarged perspective view of a section in a circle IV in FIG. 2.
Figure 5:
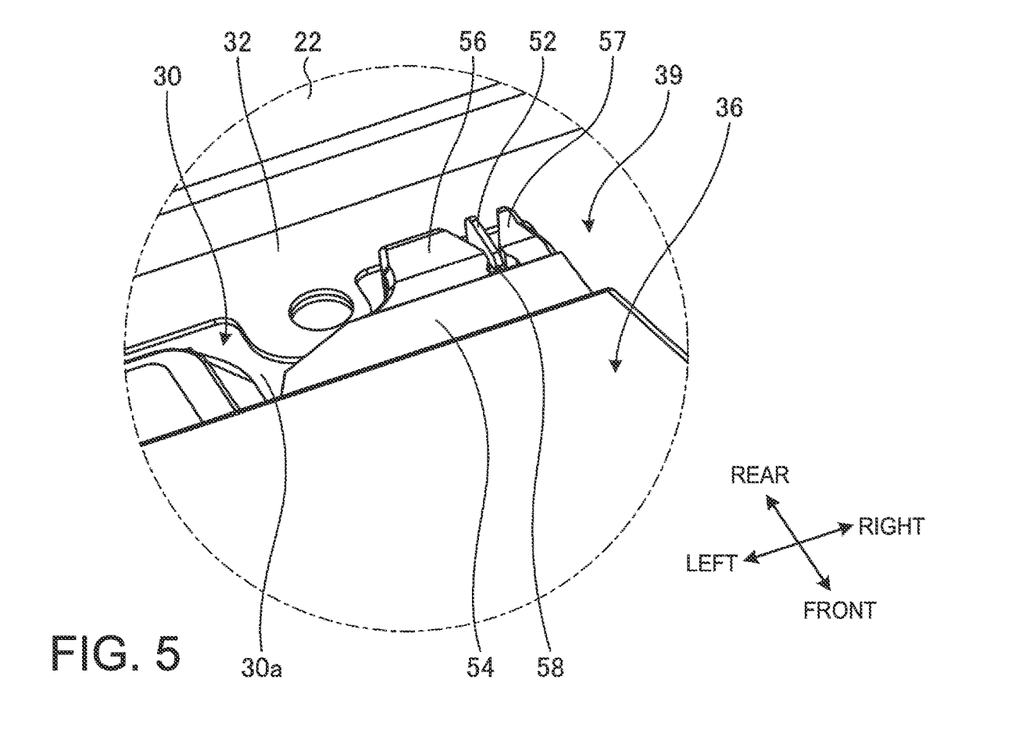
FIG. 5 is an enlarged perspective view of a section in a circle V in FIG. 2.
Figure 6:
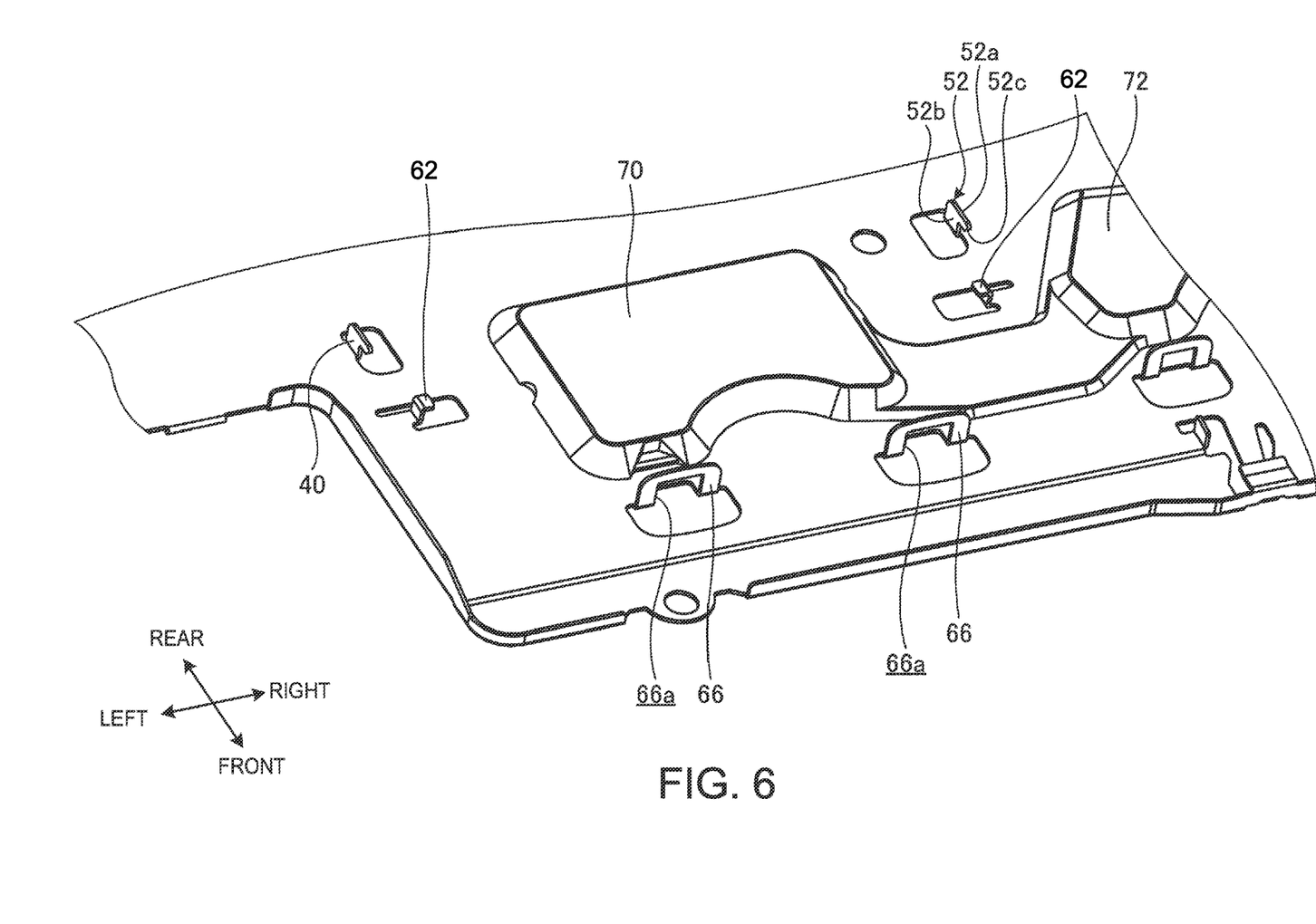
FIG. 6 is an enlarged perspective view of a portion of a base plate supporting the push button and a periphery thereof.
Figure 7:
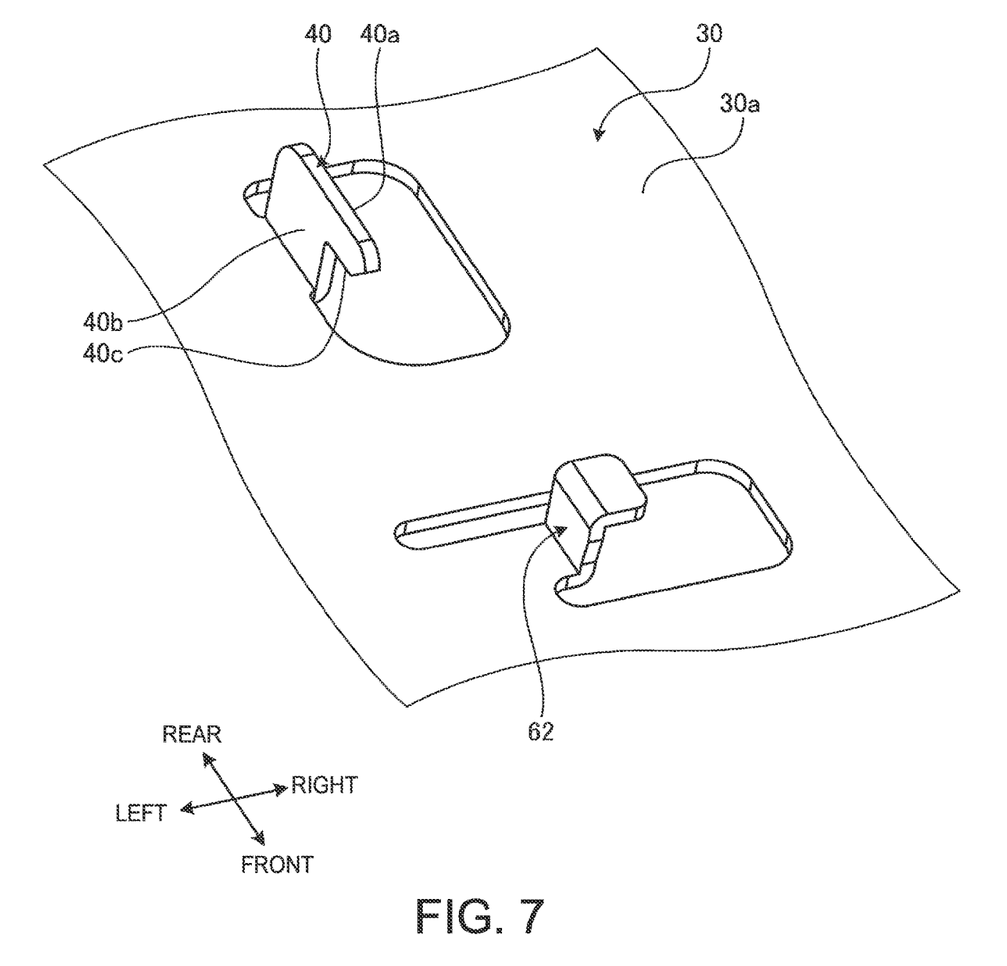
FIG. 7 is an enlarged perspective view of a portion of the base plate shown in FIG. 6.

FIG. 3 is an enlarged plan view of the push button 25 shown in FIG. 2 and the periphery thereof. FIG. 4 is an enlarged perspective view of a section in a circle IV in FIG. 2. FIG. 5 is an enlarged perspective view of a section in a circle V in FIG. 2. FIG. 6 is an enlarged perspective view of a portion of the base plate 30 supporting the push button 25 and the periphery thereof. FIG. 7 is an enlarged perspective view of a portion of the base plate 30 shown in FIG. 6.

As shown in FIGS. 1 to 3, the input device 10 is configured by the push buttons 25, 26 and 27 arranged in this order from left to right. The push buttons 25 to 27 are retained together in a laterally elongated opening 23a provided in the frame 23 (see FIGS. 1 and 3). In the present embodiment, a front inner wall surface of the opening 23a is composed of an end face of the touch pad 28. The input device 10 may include one or two push buttons. Alternatively, it may include four or more push buttons.

Now, the push button 25 on the left side is exemplarily described. Note that the push button 27 on the right side has substantially the same structure as the push button 25 on the left side except that its shape and mounting structure are symmetrical thereto. As such, elements of the push button 27 are referred to by like reference numerals used for those of the corresponding push button 25 and are not explained in detail. The push button 26 in the middle, which is different in its shape and mounting structure from the push buttons 25, 27 on the left and right sides, is not explained in detail in the present embodiment.

As shown in FIGS. 2 and 3, the push button 25 includes an operation surface part 36 as well as a positioning part 38 and a rotation support part 39 aligned in the left and right. The push button 25 is formed of a resin material, for example.

The operation surface part 36 is a plate that receives a push down operation by a user. The operation surface part 36 is substantially rectangular in a plan view and has a width dimension that is larger in the left-right direction than in the front-rear direction. A left side face 36a of the operation surface part 36 is opposed to a left inner wall surface 23b of the opening 23a. A right side face 36b of the operation surface part 36 is opposed to a side face of the neighboring push button 26. Note that, referring to an operation surface part 36 of the push button 27 on the right side, a left side face 36a thereof is opposed to a side face of the neighboring push button 26, and a right side face 36b thereof is opposed to a right inner wall surface 23c of the opening 23a (see FIGS. 1 and 2).

As shown in FIGS. 3 and 4, the positioning part 38 extends rearward from a left end of a rear edge of the operation surface part 36. The positioning part 38 is rotatably supported by a bearing part 40 protruding from the top surface 30a of the base plate 30.

As shown in FIGS. 6 and 7, the bearing part 40 is a piece of plate erected from the top surface 30a and a part thereof extends frontward so that it substantially has a shape of an "L" hook in a side view. The bearing part 40 is formed by cutting and raising the base plate 30. The plate thickness of the bearing part 40 is the same as that of the base plate 30 and can be about 0.3 mm, for example.

As shown in FIGS. 3 and 4, the positioning part 38 includes a first arm 42, an abutting part 44, a second arm 46, a pushing part 48, and a support part 50. The positioning part 38 positions the push button 25 on the base plate 30 in the left-right direction. The positioning part 38 is supported by the bearing part 40 to serve also as a hinge that rotates the push button 25.

The first arm 42 extends rearward from the rear edge of the operation surface part 36. The first arm 42 is a piece of plate having a substantially triangular shape that gradually reduces its width toward the rear. The first arm 42 is a rigid body having sufficient strength. On a tip of the first arm 42, a narrow projection piece 42a is provided.

The abutting part 44 is provided on a left side face of the projection piece 42a. The abutting part 44 abuts on a right side face 40a of the bearing part 40. The abutting part 44 serves as a stopper that positions the push button 25 on the base plate 30 in the left-right direction. The abutting part 44 has a protruding shape that gradually reduces its width toward the right side face 40a of the bearing part 40 and abuts on the right side face 40a with a flat portion formed on a tip thereof.

The second arm 46 extends rearward from the rear edge of the operation surface part 36. The second arm 46 is provided on the outer (more to the left) side than the first arm 42 and is located next to the first arm 42 with an intervening gap C. The second arm 46 is a bar member that is considerably narrower than the first arm 42. Therefore, the second arm 46 functions as a leaf spring that is resiliently deformable at least in the left-right direction.

The pushing part 48 is a protrusion protruding to the right from the tip of the second arm 46. In other words, the second arm 46 and the pushing part 48 together substantially form a shape of a hammer in a plan view. The pushing part 48 abuts on a left side face 40b of the bearing part 40. The pushing part 48 is resiliently biased by the second arm 46 toward the left side face 40b of the bearing part 40. The positioning part 38 is configured such that, when the pushing part 48 is not being subjected to an external force, a gap between the pushing part 48 and the abutting part 44 in the left-right direction is smaller than the plate thickness of the bearing part 40. This allows the positioning part 38 to hold the bearing part 40 between the pushing part 48 and the abutting part 44. That is, the pushing part 48 pushes the bearing part 40 while the second arm 46 is elastically deformed by a reaction thereof. In the present embodiment, a position where the abutting part 44 abuts on the bearing part 40 and a position where the pushing part 48 pushes the bearing 40 are deviated from each other in the front-rear direction.

The support part 50 is provided on the tip side of the first arm 42 and located on a left side of a base end of the projection piece 42a. The support part 50 is one step lower than the projection piece 42a on the top surface of the first arm 42. A left and rear edges of the support part 50 face the gap C. The top surface of the support part 50 is engaged with a bottom end face 40c of the bearing part 40. This allows the support part 50 to abut on the bearing part 40 so as to be relatively movable in the left-right direction. The support part 50 may be omitted.

As shown in FIGS. 3 and 5, the rotation support part 39 extends rearward from a right end of a rear edge of the operation surface part 36. The rotation support part 39 is located to be aligned with the positioning part 38 in the width direction (left-right direction) of the operation surface part 36. The rotation support part 39 is rotatably supported by a bearing part 52 protruding from the top surface 30a of the base plate 30. The bearing part 52 is of an identical structure to the above-described bearing part 40. The bearing part 52 is parallel to the bearing part 40 (see FIG. 6).

The rotation support part 39 has an arm 54, a pair of left and right support wall parts 56, 57, and a support part 58. The rotation support part 39 is supported by the bearing part 52 to serve as a hinge that rotates the push button 25.

The arm 54 extends rearward from the rear edge of the operation surface part 36. The arm 54 is a piece of plate having a substantially triangular shape that gradually reduces its width toward the rear. The arm 54 has substantially the same outer shape as the first arm 42 and the second arm 46 together of the positioning part 38 except that it is symmetrical thereto.

The support wall parts 56, 57 are provided on a tip of the arm 54 and located next to each other in the left-right direction. Provided between the support wall parts 56 and 57 is a gap having a width larger than the plate thickness of the bearing part 52. The support part 58 is positioned in this gap. The bearing part 52 is inserted between the support wall parts 56 and 57 from the rear. The right support wall part 57 is opposed to a right side face 52a of the bearing part 52, and the left support wall part 56 is opposed to a left side face 52b of the bearing part 52. As such, the bearing part 52 is relatively movable between the support wall parts 56 and 57 in the left-right direction.

The support part 58 is provided in front of and between the support wall parts 56 and 57. The top surface of the support part 58 is engaged with a bottom end face 52c of the bearing part 52 having a hook shape (see FIG. 6). This allows the support part 58 to abut on the bearing part 52 so as to be relatively movable in the left-right direction.

FIG. 8 is a sectional side view schematically showing the push button 25 and the periphery thereof. As shown in FIG. 8, the push button 25 has respective positioning holes 60 on the bottom surface of the first arm 42 and the arm 54. Projection pieces 62 erected from the top surface 30a of the base plate 30 are respectively inserted into the positioning holes 60.

As shown in FIGS. 6 and 7, the projection pieces 62 are respectively provided in front of the left and right bearing parts 40, 52. This means that the positioning holes 60 of the push button 25 are provided in correspondence to these left and right projection pieces 62. Each of the projection pieces 62 is a piece of plate formed by cutting and raising up the base plate 30 and bending the tip thereof to the right or left side. It has a substantial Z-shape in a front view. The projection pieces 62 are inserted into the positioning holes 60 in a slidable manner in the top-bottom direction. When inserted into the positioning holes 60, the projection pieces 62 are locked and not relatively movable in the front-rear direction. In other words, the projection pieces 62 are inserted into the positioning holes 60 so as not to be relatively movable in a direction that is perpendicular to at least a thickness direction of the bearing parts 40, 52 as well as in a direction that is parallel to the top surface 30a. Thus, the engagement of the positioning holes 60 and the projection pieces 62 determines the position of the push button 25 on the base plate 30 in the front-rear direction.

As shown in FIG. 8, the operation surface part 36 has, on its bottom surface, a lock piece 64 located somewhat rearward than the front end thereof. The lock piece 64 extends downward from the bottom surface of the operation surface part 36, and the tip thereof is bent forward. Note that a pair of left and right lock pieces 64 are provided on the bottom surface of the operation surface part 36. Meanwhile, as shown in FIG. 6, erection plates 66 are provided on the top surface 30a of the base plate 30 in positions corresponding to the left and right lock pieces 64. Each of the erection plates 66 is a piece of plate having a shape of a gate that is wide in the left-right direction, thereby forming a rectangular lock hole 66a. The lock piece 64 is inserted into the lock hole 66a so as to be movable in the top-bottom direction. An upward movement of the lock piece 64 is limited by the top part of the erection plate 66, which prevents the push button 25 from slipping off from the base plate 30. The reference numeral 68 in FIG. 8 denotes a switch turned on by the bottom surface of the push button 25 when it is rotated by pushing the operation surface part 36.

Referring now to FIG. 2, the reference numerals 70, 71 and 72 denote protruding portions formed by swelling the base plate 30 from the bottom surface 30b side to the top surface 30a side. They protrude upward from the top surface 30a. The protruding portions 70 to 72 respectively have height dimensions that do not interfere with the push buttons 25 to 27 and are located thereunder. The backsides of the protruding portions 70 to 72 form recessed portions to receive a logic substrate (not shown) provided on the bottom surface 30b side of the base plate 30. The logic substrate is connected to the pointing stick 24 and converts an analog signal output from the sensor substrate upon operation of the pointing stick 24 to an electrical signal.

As described above, the positioning part 38 of the input device 10 of the present embodiment includes the abutting part 44 which abuts on the right side face 40a of the bearing part 40 and the pushing part 48 which is resiliently biased toward and pushes the left side face 40b of the bearing part 40. The positioning part 38 positions the push button 25 in the thickness direction of the bearing part 40.

Thus, the positioning part 38 holds the bearing part 40 between the resiliently biased pushing part 48 and the abutting part 44. Therefore, the positioning of the positioning part 38 in the left-right direction relative to the bearing part 40 (base plate 30) is made based on the abutting part 44. As a result, the push button 25 (27) is supported on the base plate 30 with high positioning accuracy. Since the pushing part 48 is resiliently biased toward the bearing part 40, a gap between the positioning part 38 and the bearing part 40 can be eliminated. This makes it possible to prevent looseness between the positioning part 38 and the bearing part 40. In addition, the positioning part 38 does not tighten the rotational movement with respect to the bearing part 40 too much, thereby ensuring a smooth operation of the push button.

Here, the rotation support part 39 is rotatably supported by the bearing part 52 in such a manner that the rotation support part is movable in the left-right direction. This allows the rotation support part 39 not to impair the positioning by the positioning part 38 in the left-right direction, thereby stabilizing the rotational movement of the push button 25 better.

In the positioning part 38 of the present embodiment, the positions where the abutting part 44 and the pushing part 48 touch the bearing part 40 are deviated from each other in the extension direction of the second arm 46, i.e., along the side faces 40a, 40b of the bearing part 40. This allows the positioning part 38 to be smoothly punched out when formed by metal mold. Moreover, as the abutting part 44 and the pushing part 48 contact the bearing part 40 at different positions on the respective side thereof, the abutting part 44 is fixed in the left-right direction, and the pushing part 48 reliably pushes the bearing part 40 with the abutting part as a reference position. As a result, the positioning accuracy of the positioning part 38 in the left-right direction is further improved.

The push button 25 (27) includes the positioning part 38 and the rotation support part 39 both extending rearward from the rear edge of the operation surface part 36. As a result, a rotating shaft formed by the positioning part 38, rotation support part 39 and bearing parts 40, 52 is located outside the operation surface part 36. As is clear from FIG. 8, this allows the entire top surface of the operation surface part 36 to be pushed down, which provides high operability. If the rotating shaft is located directly under the operation surface part 36, at least the portion of the operation surface part 36 that is placed right above the rotating shaft cannot be pushed down. Nevertheless, it is possible in the input device 10 to place the rotating shaft directly under the operation surface part 36, as this arrangement still allows the above described effect of positioning to be provided by the positioning part 38.

In the push button 25 shown in FIG. 3, for example, the positioning part 38 and the rotation support part 39 may be replaced with each other. In that case, however, the positioning part 38 serving for the positioning in the left-right direction is located on the right side. Therefore, the left side face 36a of the operation surface part 36 is positioned in consideration of a width dimensional tolerance in the left-right direction of the operation surface part 36. This leads to a concern that the side face 36a may interfere with the inner wall surface 23b of the frame 23 on the left side of the operation surface part 36. On the other hand, according to the above described embodiment, the positioning part 38 serving for the positioning in the left-right direction is located on the side of the side face 36a opposed to the inner wall surface 23b. As such, it is possible to avoid the interference between the side face 36a and the inner wall surface 23b and to minimize a gap therebetween to improve appearance quality. Note that the push button 27 on the right side has a structure symmetrical to that of the push button 25 on the left side. Therefore, the push button 27 has the positioning part 38 on the side of the side face 36b of the operation surface part 36 opposed to the right inner wall surface 23c of the frame 23.

The present invention is not limited to the foregoing disclosure and can be freely changed without departing from the scope of the present invention.

In the above description, the operation surface part 36 has been provided with the positioning part 38 and the rotation support part 39 on its right and left side, respectively. However, the rotation support part 39 may be omitted, as it is not involved in the positioning in the left-right direction.

In the above description, the bearing parts 40, 52 directly provided on the base plate 30 have exemplarily been shown. However, the bearing parts may be formed by laminating a resin plate or the like onto the top surface 30a of the base plate 30. In that case, the base plate 30 and the resin plate are collectively considered as a base plate, and the bearing parts 40, 52 should preferably be formed either on the base plate 30 or the resin plate.

In the above description, the push button 26 in the middle has been different in its structure from the push buttons 25, 27 on the left and right sides. However, the push button 26 may have the same or similar shape and mounting structure to those of the push buttons 25, 27 on the left and right sides.

The invention claimed is:

1. An input device comprising:
a base plate; and
a rotatable push button on a top surface of the base plate, wherein:
the base plate has a bearing part protruding from the top surface,
the push button has an operation surface part configured to receive a push down operation and a positioning part rotatably supported by the bearing part, and
the positioning part has an abutting part abutting a first face of the bearing part and a pushing part resiliently biased toward and pushing a second face opposite to the first face, the abutting part and the pushing part position the push button in a plate thickness direction of the bearing part.

2. The input device according to claim 1, wherein a position where the abutting part abuts on the first face and a position where the pushing part pushes the second face are deviated from each other in a direction along the first face of the bearing part.

3. The input device according to claim 1, wherein:
the abutting part and the pushing part are at positions deviated from the operation surface part in a plan view, and
a rotating shaft between the positioning part and the bearing part is outside the operation surface part in a plan view.

4. The input device according to claim 1, wherein the positioning part further has:
a first arm extending from an edge of the operation surface part; and
a second arm extending from another edge of the operation surface part, the second arm being aligned with the first arm and provided with the pushing part on a tip thereof.

5. The input device according to claim 4, wherein:
the bearing part has a hook shape erected from the top surface of the base plate and bent, and
the positioning part further has a support part on which a bottom end face of the bearing part abuts so as to be relatively movable in the plate thickness direction.

6. The input device according to claim 1, wherein:
the base plate further has a second bearing part protruding from the top surface and being parallel to the bearing part,
the push button further has a rotation support part configured to be aligned with the positioning part in a width direction of the operation surface part and rotatably supported by the second bearing part, and
the rotation support part is supported by the second bearing part such that the rotation support part is movable along a plate thickness direction of the second bearing part.

7. The input device according to claim 1, wherein:
the base plate further has a projection piece erected from the top surface,
the push button further has a positioning hole on a bottom surface thereof, the projection piece being slidably insertable into the positioning hole, and
the projection piece is insertable into the positioning hole so as not to be relatively movable in a direction that is perpendicular to at least the plate thickness direction as well as in a direction that is parallel to the top surface.

8. An electronic apparatus comprising:
a keyboard device having an input device;
the input device comprising:
a base plate; and
a rotatable push button on a top surface of the base plate, wherein:
the base plate has a bearing part protruding from the top surface,
the push button has an operation surface part configured to receive a push down operation and a positioning part rotatably supported by the bearing part, and
the positioning part has an abutting part abutting a first face of the bearing part and a pushing part resiliently biased toward and pushing a second face opposite to the first face, the abutting part and the pushing part position the push button in a plate thickness direction of the bearing part
a plurality of key tops supported on a top surface of the base plate so as to be movable in a top-bottom direction;
a main body chassis with the keyboard device; and
a display chassis pivotably connected to the main body chassis and having a display.

* * * * *